United States Patent [19]

Leiderer

[11] Patent Number: 5,379,981

[45] Date of Patent: Jan. 10, 1995

[54] HOLDING DEVICE FOR A STORAGE TANK

[75] Inventor: Hermann Leiderer, Worth/Donau, Germany

[73] Assignee: Linde Aktiengesellschaft, Wiesbaden, Germany

[21] Appl. No.: 106,950

[22] Filed: Aug. 17, 1993

[30] Foreign Application Priority Data

Aug. 17, 1992 [DE] Germany ............... 4227189

[51] Int. Cl.⁶ .............................................. F16M 13/00
[52] U.S. Cl. .................................. 248/550; 220/445; 220/901
[58] Field of Search ............... 248/550, 589, 610; 220/401, 421, 445, 901; 62/45.1, 51.1

[56] References Cited

U.S. PATENT DOCUMENTS

| | | |
|---|---|---|
| 3,814,361 | 6/1974 | Gabron . |
| 3,913,775 | 10/1975 | Ozaki ............... 220/901 X |
| 4,098,426 | 7/1978 | Gerhard ............... 220/401 |
| 4,176,761 | 12/1979 | Gobl ............... 220/421 X |
| 4,184,609 | 1/1980 | Vorreiter ............... 220/445 |
| 4,481,778 | 11/1984 | Reinker . |
| 4,773,632 | 9/1988 | Hartel ............... 248/550 X |
| 4,821,907 | 4/1989 | Castles ............... 62/45.1 X |
| 4,848,103 | 7/1989 | Pelc ............... 62/51.1 |
| 4,883,248 | 11/1989 | Uchino ............... 248/550 |
| 5,012,948 | 5/1991 | Bergh ............... 220/901 X |

FOREIGN PATENT DOCUMENTS

| | | | |
|---|---|---|---|
| 1220198 | 5/1960 | France ............... | 220/901 |
| 2608725 | 6/1988 | France . | |
| 802709 | 10/1958 | United Kingdom ........... | 220/901 |

Primary Examiner—J. Franklin Foss
Attorney, Agent, or Firm—Millen, White, Zelano, & Branigan

[57] ABSTRACT

The invention relates to a device for holding a storage tank by tensile stress inside an object, especially a movable object, e.g., a satellite, aircraft or motor vehicle, in which the storage tank is used for the storage of liquid or gaseous fluids, whose temperature exhibits a difference of at least 10° C., in particular 30° C., preferably 50° C., to the outside temperature of the object. Here, the holding device contains a molded part made of a shape memory alloy (memory metal), which in the case of comparatively high mechanical stresses, especially during the take-off or lift-off of an aircraft or satellite or the driving of a motor vehicle, results in an increase of tensile stress, and in the case of comparatively small mechanical stresses, especially during flying of an aircraft or satellite or the standing of a motor vehicle, results in a reduction of tensile stress.

18 Claims, 2 Drawing Sheets

HOLDING DEVICE FOR A STORAGE TANK

SUMMARY OF THE INVENTION

The invention relates to a device for holding a storage tank by tensile stress inside an object, especially a movable object, such as a satellite, aircraft or motor vehicle, in which the storage tank is used for the storage of liquid or gaseous fluids, whose temperature preferably exhibits at least a difference of 10° C., especially at least 30° C., and in particular at least 50° C. with respect to the outside temperature of the object.

Among liquid or gaseous fluids, helium or hydrogen are, for example, increasingly important in technical applications. Especially hydrogen will be used in the upcoming years or decades as one of the main sources of energy. Hydrogen-operated motor vehicles have already existed for some years in the test stage. In the coming years, the first large-capacity experimental aircraft are to be operated with hydrogen.

In aerospace engineering, especially in certain types of satellites, the "taking along" of helium into orbit is indispensable for operation of measuring devices, transmitters, receivers, etc.

Further, there are applications in which the temperature of the liquid or gaseous fluids stored in the storage tank is higher than the outside temperature of the object. In these cases, the prevention of the penetration of cold into the storage tank can be desirable.

The storage tanks necessary for the above-mentioned applications, which can represent only an incomplete list, have to be designed or built so that the evaporation losses of the liquid or gaseous fluids can be kept as low as possible. But, this can be achieved only if the penetration of heat into the interior of the storage tank is avoided. The greatest penetrations of heat occur mostly by the fastening devices of the storage tanks. Heat penetration has to be kept as low as possible, especially in the case of storage tanks in satellites since, as a rule, refilling of the storage tank is not possible. The fastening devices of the storage tanks should therefore be designed so the heat penetration is minimal.

However, storage tanks for gaseous or liquid fluids in aircraft or satellites have to withstand great stresses during certain periods, such as, e.g., the starting or acceleration process. For this reason, a connection between the storage tank and the object capable of being subjected to great mechanical stresses is needed.

In contrast to the high stresses as occur, e.g., during the take-off or lift-off of aircraft and satellites, the mechanical stresses during the flying phase are considered to be rather small. A holding device suitable for the starting process will thus be oversized for the flying period.

An object of the invention, therefore, is to provide a device for holding a storage tank by tensile stress inside an object, which in the case of comparatively high mechanical stresses, especially during the driving of a motor vehicle or the take-off or lift-off of an aircraft or satellite, assures a stable connection between the storage tank and, in the case of comparatively small mechanical stresses, especially during the standing of a motor vehicle or the flying phase of an aircraft or a satellite, can withstand slight mechanical stresses and is poorly heat-conducting between the storage tank and the object.

Upon further study of the specification and appended claims, further objects and advantages of this invention will become apparent to those skilled in the art.

These objects are achieved according to the invention by a holding device which contains a molded part made of a shape memory alloy (memory metal). In the case of comparatively high mechanical stresses, especially during the take-off or lift-off of an aircraft or satellite or the driving of a motor vehicle, shape memory alloy results in an increase in tensile stress, and in the case of comparatively small mechanical stresses, especially during flying of an aircraft or satellite or standing of a motor vehicle, results in a reduction of tensile stress.

Shape memory alloys have the property that they assume shapes into which they are "forced" below a certain temperature, the so-called switching temperature, and when the switching temperature is again exceeded, they assume their original shape. This effect is the result of a thermoelastic, martensitic conversion, in which the conversion temperature can be adjusted in the range of about −100° C. to 100° C. The shape memory effect occurs in several alloy systems, e.g., Ni/Ti-alloys, Cu-alloys, and Fe-alloys. But, nickel-titanium alloys represent the most technically important shape memory alloys today. Nitinol alloys are examples of memory alloys.

By means of the device for holding a storage tank according to the invention, heat penetration through the fastening devices into the storage tank is reduced during the phases in which the object is not exposed to any high mechanical stress. This means that, e.g., in the case of a satellite, the use of coolant can be drastically reduced and thus the lifetime or service life of the measuring devices located in or on the satellite can be correspondingly lengthened.

But still the fastening devices of the storage tank are made so they can withstand the occurrence of mechanical stresses.

By use of a molded part made of a shape memory alloy, the "switching" between the state that can be mechanically more greatly stressed and the state than can be mechanically less greatly stressed can take place without the use of active components, such as, e.g., motor actuators. As a result, possible sources of error can be precluded, especially in the case of satellites.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 42 27 189.4, filed Aug. 17, 1992, are hereby incorporated by reference.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
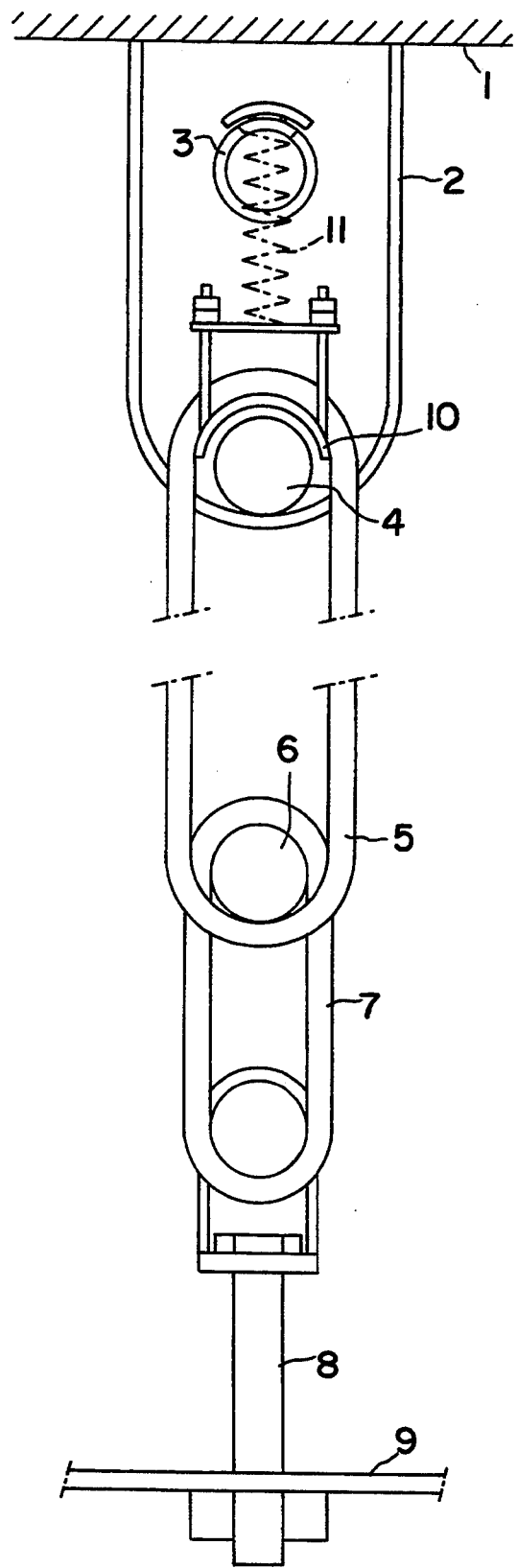
FIG. 1 illustrates a side view of a holding device in accordance with the invention.

FIG. 1 shows, in side view, a device for holding a storage tank (1) in a satellite, in which the holding device is represented in the less greatly mechanically stressed state. The device comprises two straps (2) fastened to storage tank (1) at a distance from one another, which are designed to receive a first pipe (3), near the storage tank, and a second pipe (4), distant from the storage tank. Pipe (4) is engaged with an eyelet (5), which involves a belt made of metal or another equivalent material. Eyelet (5) is connected, via at least one other pipe (6) and another eyelet (7), as well as with a fastening part (8) made of a shape memory alloy (memory metal), to object (9), which involves, in this case, the satellite. Between the engagement of eyelet (5) with pipe (4), a cap (10) is placed, which is connected by an elastic element (11) with pipe (3) near the storage tank. In this representation, elastic element (11) is a spiral spring. Of course, instead of pipes (3, 4), pins could also be used, but this would mean, with the same material of the pipes or pins, a higher heat conductivity.

During the starting or acceleration phase, the length of fastening part (8) made of the shape memory alloy is selected so that cap (10) lies on pipe (4) which is distant from the storage tank (not represented in the figure). The occurring forces are thus absorbed by the system of straps (2)—pipe (4)—eyelet (5)—pipe (6)—eyelet (7)—fastening part (8)—object (9). Because of the relatively large support surfaces between the individual components, a high heat penetration into storage tank (1) results.

After completion of the starting or acceleration phase, thus approximately when the satellite reaches the predetermined orbit, the ambient temperature drops to about 200° K. The switching temperature for the shape memory alloy now has to be selected between the latter and that before the starting or acceleration phase. In the case of falling below the switching temperature, fastening part (8) made of the shape memory alloy changes into its original state. This means in this case that it passes through a change in length and as a result lifts cap (10) from pin (4) (represented in the figure). The heat flow is now diverted to spiral spring (11), by which, on the one hand, the distance covered increases and the cross-section area is reduced. A reduction of the cross-section area can be achieved, e.g., also by the use of eyelets (4, 7) that are as thin as possible.

An additional electric heating device possibly can be attached to fastening part (8) made of the shape memory alloy.

Figures 2, 3:
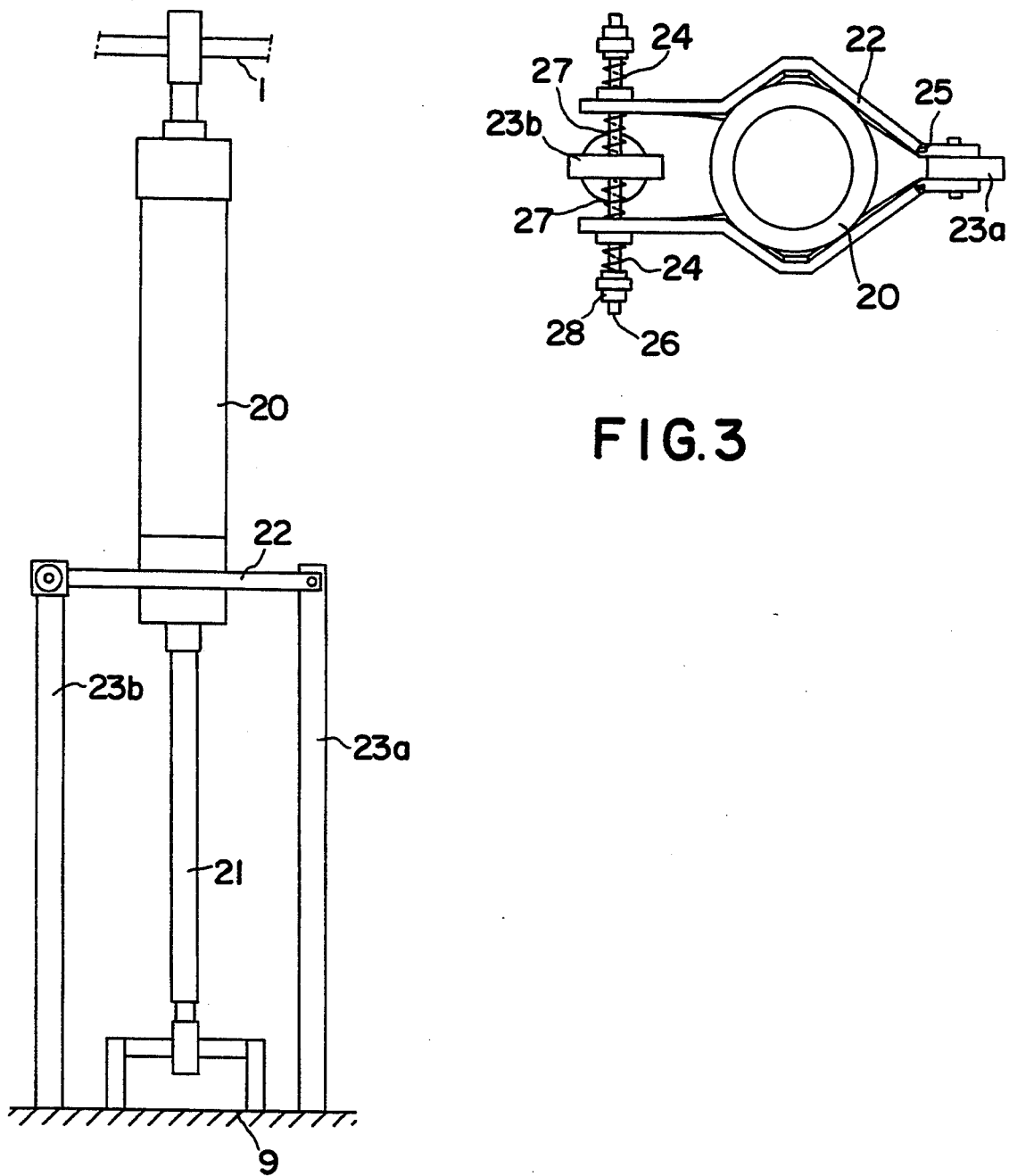
FIG. 2 illustrates a side view of another holding device according to the invention.
FIG. 3 illustrates a cross-sectional view of the holding device of FIG. 2.

FIG. 2 shows, in side view, another device for holding a storage tank (1) in a satellite. The device comprises two struts (20, 21) that are coaxially in tandem and connected to one another. Strut (20) which can be mechanically more greatly stressed is fastened to storage tank (1) and strut (21) which can be less greatly mechanically stressed is fastened to object (9), i.e., the satellite. The end, distant from the storage tank, of strut (20) is bordered by an expanding frame (22), which is connected with a metal frame (23a, 23b) fastened to object (9). Expanding frame (22) is in operative connection with an opening/closing element (24) made of a shape memory alloy.

FIG. 3 shows the nature of this operative connection. In it, a cross-section through the holding device above expanding frame (22), i.e., looking in the direction of object (9), is represented. Expanding frame (22) is tightly mounted, on the one side, to one of struts (23a) of the metal frame. To permit the possibility of expansion of frame (22), the frame is provided on this side with hinges (25). Frame (22) is connected, on the opposite side, by a pin (26) to strut (23b) of the metal frame. Steel springs (27) are attached between strut (23b) and frame (22) and springs made of shape memory alloy (24) are attached between frame (22) and nuts (28) located on the ends of pin (26).

The spring power of the springs made of shape memory alloy (24) is greater than the spring power of steel springs (27) at ambient temperatures, as they prevail on the ground. During the starting or acceleration phase, frame (22) is compressed and encompasses the end, distant from the storage tank, of strut (20), which can be more greatly stressed. For this reason, an indentation is milled in the end, distant from the storage tank, of strut (20), at the level of frame (22), an indentation in which frame (22) engages. After completion of the starting or acceleration phase, the spring power of the springs made of shape memory alloy (24) changes, by which expanding frame (22) slightly opens and thus strut (20) is "released." The occurring forces are now absorbed by strut (20) and strut (21), which can be less greatly stressed, in contrast to the starting or acceleration phase, during which they are absorbed by strut (20) and the frame. The heat flow corresponding to the heat resistance of strut (21) is reduced by the elimination of the heat flow through expanding frame (22) and struts (23a, 23b).

The preceding can be repeated with similar success by substituting the generically or specifically described reactants and/or operating conditions of this invention for those used.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a device for holding a tank by tensile stress inside a movable object, wherein said tank is used to store liquid or gaseous fluids exhibiting temperature differences of at least 10° C. with respect to the temperature outside said object, the improvement wherein the holding device contains a molded part made of a shape memory alloy, which under high mechanical stress induces an increase of tensile stress, and under smaller mechanical stress induces a reduction of tensile stress, and wherein said holding device comprises two straps, a first pipe, a second pipe, at least one other pipe, a first eyelet, a second eyelet, a fastening means and a cap;

said two straps are fastened to said tank at a distance from one another, said straps receiving said first pipe near said tank and said second pipe distant from said tank;

said second pipe engaging said first eyelet;

said first eyelet being connected to said movable object via said at least one other pipe, said second eyelet, and said fastening means, wherein said fastening means is said molded part made of a shape memory alloy; and between said first eyelet and said second pipe said cap is positioned, said cap being connected by an elastic element to said first pipe.

2. A device according to claim 1, wherein an electric heating device is attached to said molded part of shape memory alloy.

3. A device according to claim 2, wherein an electric heating device is attached directly adjacent to said molded part of shape memory alloy.

4. A device according to claim 1, wherein said movable object is an airplane.

5. A device according to claim 1, wherein said movable object is a satellite.

6. A device according to claim 1, wherein said movable object is an automobile.

7. In a device for holding a tank by tensile stress inside a movable object, wherein said tank is used to store liquid or gaseous fluids exhibiting temperature differences of at least 10° C. with respect to the temperature outside said object, the improvement wherein the holding device contains a molded part made of a shape memory alloy, which under high mechanical stress induces an increase of tensile stress, and under smaller mechanical stress induces a reduction of tensile stress, and wherein said holding device comprises a first strut, a second strut, an expanding frame and an opening/closing element, said first strut and said second strut are coaxially connected to one another, said first strut is capable of being more greatly mechanically stressed than said second strut, said first strut is fastened at one end to said tank and said second strut is fastened to said movable object, wherein the other end of said first strut is bordered by said expanding frame connected to a metal frame fastened to said movable object, and said expanding frame is in operative connection with said opening/closing element, which is said molded part made of a shape memory alloy.

8. A device according to claim 7, wherein an electric heating device is attached to said molded part of shape memory alloy.

9. A device according to claim 7, wherein an electric heating device is attached directly adjacent to said molded part of shape memory alloy.

10. A device according to claim 7, wherein said movable object is an airplane.

11. A device according to claim 7, wherein said movable object is a satellite.

12. A device according to claim 7, wherein said movable object is an automobile.

13. A device for connecting a first object with a second object, said device comprising:

first fastening means for connecting to a first object, said first fastening means comprising two straps fastened to said first object at a distance from one another;

second fastening means for connecting to a second object, said second fastening means being made of shape memory alloy having a switching temperature; and connection means which connect said first fastening means with said second fastening means, said connection means comprising a first pipe, a second pipe, at least one other pipe, a first eyelet, a second eyelet and a cap, said first pipe and said second pipe are received by said straps, said first pipe is positioned near said first object and said second pipe is positioned distant from said first object, said first eyelet is engaged by said second pipe, said first eyelet is connected to said second object via said at least one other pipe, said second eyelet, and said fastening means made of shape memory alloy, and said cap is positioned between said first eyelet and said second pipe wherein said cap is connected by an elastic element to said first object;

wherein said device can withstand higher mechanical stresses when at a temperature about said switching temperature of said second fastening means than when at a temperature below said switching temperature and wherein, when said device is at a temperature below said switching temperature, heat flow through said connection means is reduced.

14. A device according to claim 13, wherein an electric heating device is attached to said second fastening means.

15. A device according to claim 13, wherein an electric heating device is attached directly adjacent to said second fastening means.

16. A device for connecting a first object with a second object, said device comprising:

a first strut, a second strut, an expanded frame, and an opening/closing element, said first strut and said second strut are coaxially connected to one another, said first strut is capable of being more greatly mechanically stressed than said second strut, said first strut is fastened at one end to said first object and said second strut is fastened to said second object, wherein the other end of said first strut is bordered by said expanded frame connected to a metal frame fastened to said second object, and said expanded frame is in operative connection with an opening/closing element made of shape memory alloy having a switching temperature.

17. A device according to claim 16, wherein an electric heating device is attached to said second fastening means.

18. A device according to claim 16, wherein an electric heating device is attached directly adjacent to said second fastening means.

* * * * *